(12) United States Patent
Beylin

(10) Patent No.: US 6,493,698 B1
(45) Date of Patent: Dec. 10, 2002

(54) STRING SEARCH SCHEME IN A DISTRIBUTED ARCHITECTURE

(75) Inventor: Boris Beylin, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/361,347

(22) Filed: Jul. 26, 1999

(51) Int. Cl.$^7$ ............................................. G06F 17/30
(52) U.S. Cl. ........................ 707/1; 707/10; 707/102; 707/3; 709/203; 709/228
(58) Field of Search ............................. 707/1–10, 102; 709/203, 228

(56) References Cited

U.S. PATENT DOCUMENTS

| | | | | |
|---|---|---|---|---|
| 5,452,451 A | * | 9/1995 | Akizawa et al. | 707/6 |
| 5,778,368 A | * | 7/1998 | Hogan et al. | 707/10 |
| 5,781,772 A | * | 7/1998 | Wilkinson, III et al. | 707/3 |
| 6,018,524 A | * | 1/2000 | Turner et al. | 707/2 |
| 6,052,122 A | * | 4/2000 | Sutcliffe et al. | 707/102 |
| 6,157,955 A | * | 12/2000 | Narad et al. | 709/228 |
| 6,195,661 B1 | * | 2/2001 | Filepp et al. | 707/102 |
| 6,199,100 B1 | * | 3/2001 | Filepp et al. | 709/203 |

\* cited by examiner

*Primary Examiner*—Kim Vu
*Assistant Examiner*—Anh Ly
(74) *Attorney, Agent, or Firm*—Blakely, Sokoloff, Taylor & Zafman LLP

(57) ABSTRACT

Methods and apparatuses for searching network data for one or more predetermined strings are disclosed. In one embodiment, the string search is a multi-stage search where the stages of the search are performed by different hardware components. In one embodiment in a first search stage, a first processor performs a comparison of blocks of incoming data to determine whether the blocks potentially represent the beginning of one of the predetermined strings. If a potential predetermined string is identified, a second processor performs a further search to determine whether the string matches one of the predetermined strings. Because the first processor searches only for the beginning of the predetermined strings, the first stage comparison can be performed quickly, which improves network performance as compared to more detailed searching. The second stage is performed by second processor, which allows the first processor to search for potential matching strings. Because many strings do not match the one or more predetermined strings, the more detailed search performed by the second processor is performed selectively, which increases network performance as compared to more detailed searches on all network data.

3 Claims, 5 Drawing Sheets

| 8 | | | | |
|---|---|---|---|---|
| | 204 *420* | 'G' *430* | 'T' *440* | 20 *450* |
| | 230 *460* | 'X' *470* | 'O' *480* | 54 *490* |
| | ... | | | |

STRING SEARCH SCHEME IN A DISTRIBUTED ARCHITECTURE

FIELD OF THE INVENTION

The invention relates to identification of predefined patterns in digital data. More particularly, the invention relates to a scheme for identifying a string of data using a multi-stage searching technique.

BACKGROUND OF THE INVENTION

In recent years computer networks have changed many aspects of life. For example, in a few short years, the Internet has changed the manner in which information is sent and received, the way goods and services are bought and sold, and the way that financial matters are handled. Standard applications such as web browsers and protocols such as Transmission Control Protocol/Internet Protocol (TCP/IP) have become integral to the success of networks.

In order to provide more information and services to more people and to more places, networks have become easier to use and more reliable. However, making the network operate smoothly requires a high degree of interoperability, scalability and platform independence. One aspect of networking is policy enforcement. Policy enforcement provides a way to give some types of traffic, such as real-time video, priority over other, less important traffic, such as electronic mail. Policy enforcement can also provide intrusion detection.

Policy enforcement has been provided with general purpose computers, fixed function appliances, and/or switches and routers. General purpose computers that provide policy enforcement typically include two or more network interface cards (NICs) that provide multiple connections to the network. Policy enforcement is provided by the processor of the general purpose computer. However, general purpose computers are not developed to perform high-speed operations on network packets. Because of this policy enforcement with general purpose computers is a bottleneck to network performance.

In an attempt to overcome the performance limitations of using general purpose computers for policy enforcement, fixed-function devices specifically designed to support policy enforcement have been developed. Typically, these fixed-function appliances have a processor and/or customized hardware and two or more NICs. While fixed-function appliances can be fast enough for some network operations, scalability is restricted.

Switches and routers have been used to provide policy enforcement. However, switches and routers typically do not have sufficient processing power to provide policy enforcement in addition to switching and routing functionality. The processors of the switches and routers must be used for both policy enforcement and for switching and/or routing functionality, which decreases network performance. Alternatively, switches and routers can be designed with more powerful processors, which increases the cost of the switches and routers.

SUMMARY OF THE INVENTION

A method and apparatus for searching for a string of data matching a predetermined string of data is described. A first stage search is performed on the data. The first stage search identifies one or more potential strings of interest having a pattern matching a portion of the predetermined string. A second stage search is performed on the data corresponding to the one or more potential strings of interest to determine whether a match exists. In one embodiment the first stage search is performed by a first processor and the second stage search is performed by a second processor. In another embodiment, the first stage search and the second stage search are performed by a single processor if performed in sequence.

BRIEF DESCRIPTION OF THE DRAWINGS

The invention is illustrated by way of example, and not by way of limitation in the figures of the accompanying drawings in which like reference numerals refer to similar elements.

FIG. 4 illustrates one embodiment of a search report generated by one embodiment of a classification engine.

DETAILED DESCRIPTION

A method and apparatus for searching for predetermined strings in network data is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Methods and apparatuses for searching data for one or more predefined strings are disclosed. In one embodiment, the data is part of network traffic; however, any data can be searched as described herein. In one embodiment, the string search is a multi-stage search where the stages of the search are performed by different hardware components; however, multiple stages can be performed by a single hardware component.

In one embodiment in a first search stage, a first processor performs a comparison of blocks of incoming data to determine whether the blocks potentially represent the beginning of one of the predetermined strings. If the beginning of a predetermined string is identified, a second processor performs a further search to determine whether the string matches one of the predetermined strings. Because the first processor searches only for the beginning of the predetermined string, the first stage comparison can be performed quickly, which improves network performance as compared to more detailed string searching in which the entire string is compared. Thus, the first processor operates as a filter on the blocks of incoming data.

The second stage is performed by second processor, which allows the first processor to search for potential matching strings in another packet. Thus, the first and second stages allow the search to be pipelined. Because many strings do not match the one or more predetermined strings, the more detailed search performed by the second processor is performed on a subset of packets, which increases network performance as compared to more detailed searches on all network data.

Figure 1:
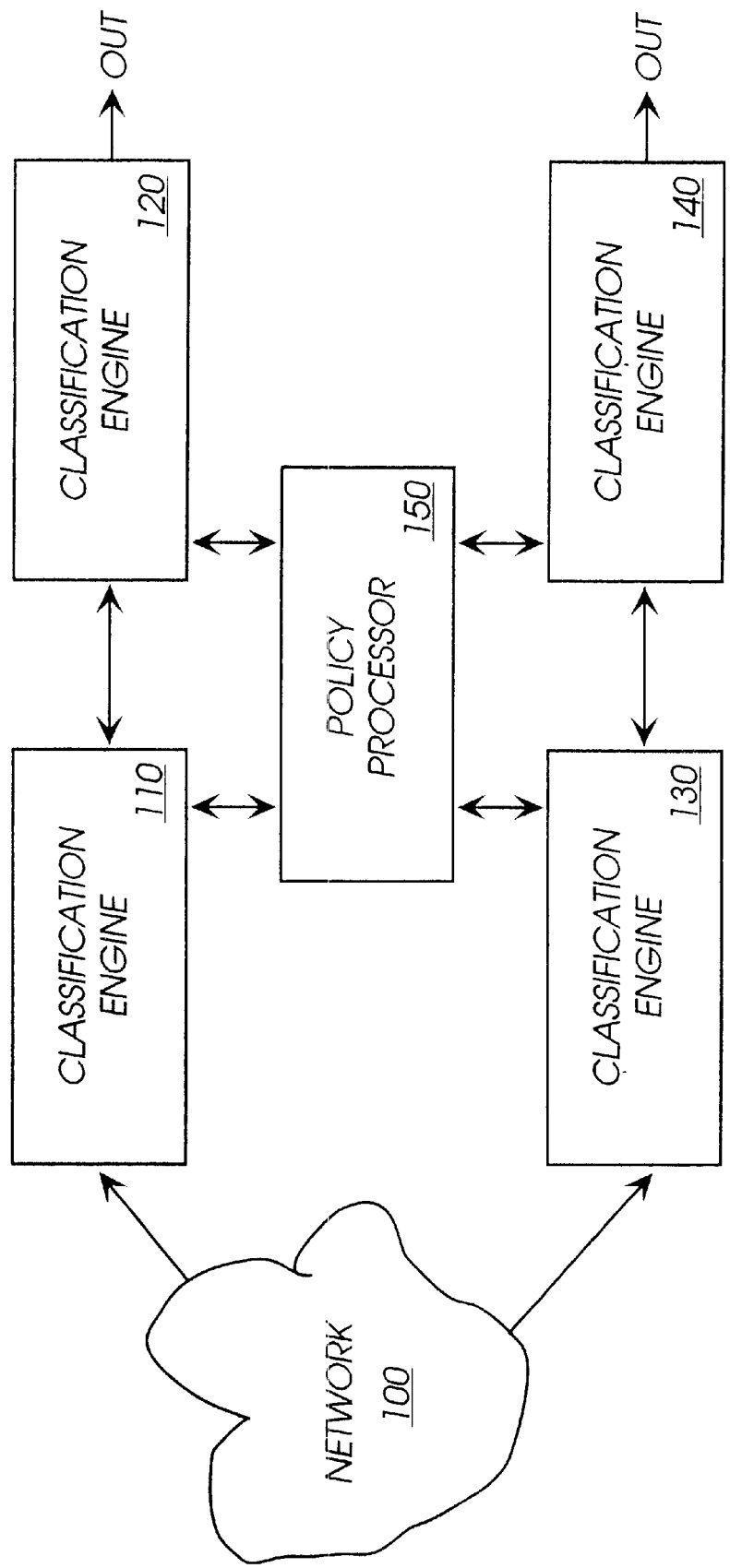
FIG. 1 illustrates one embodiment of an architecture for identifying strings in network traffic.

FIG. 1 illustrates one embodiment of an architecture for identifying strings in network traffic. The embodiment of FIG. 1 includes four classification engines, which are described in greater detail below; however, any number of classification engines can be used as described herein to perform string searches.

Network 100 can be any interconnection of computers and other electronic devices. For example, network 100 can be the Internet, a wide area network (WAN), a local area network (LAN), etc. Network 100 can communicate data using any appropriate protocol, for example, TCP/IP.

Classification engines 110 and 130 are coupled to network 100. In one embodiment, classification engines 100 and 130 are coupled to receive packets from network 100. In an alternative embodiment, classification engines 110 and 130 can also transmit packets to network 100. Classification engine 110 is coupled to policy processor 150 and to classification engine 120. Policy processor 150 is also coupled to classification engine 120. In one embodiment, classification engine 120 outputs processed packets. In an alternative embodiment, classification engine 120 can send and receive packets. In one embodiment, "packet" refers to a set of data independent of the protocol used to communicate the data.

Classification engine 130 is coupled to policy processor 150 and to classification engine 140. Policy processor 150 is also coupled to classification engine 140. In one embodiment, classification engine 140 outputs processed packets. In an alternative embodiment, classification engine 140 can send and receive packets. In alternative embodiments, multiple policy processors can be used.

In general terms, the string search technique described herein operates on a classification/action model. One or more classification engines classify network packets and one or more policy engines perform an action on the packet based on the classification. In one embodiment, string searches are performed in two stages. In the first stage, a classification engine operates as an abstract filter to identify locations in input data where potential string matches may exist. In the second stage, a policy processor performs actual pattern matching in the locations identified by the classification engine. Thus, detailed searching is performed by a policy processor that is not required to process all network packets. This pipelined approach to searches of network traffic provides increased network performance as compared to non-pipelined searches.

Prior to searching, an initialization is performed. In one embodiment, initialization includes building a tree structure describing the strings to be searched for and a look up table to be used in the first stage of the search. In one embodiment, the tree structure is used to define a non-deterministic finite automaton (NDFA) that is represented by a directed graph; however, other representations of the strings to be searched for can also be used.

Figure 2:
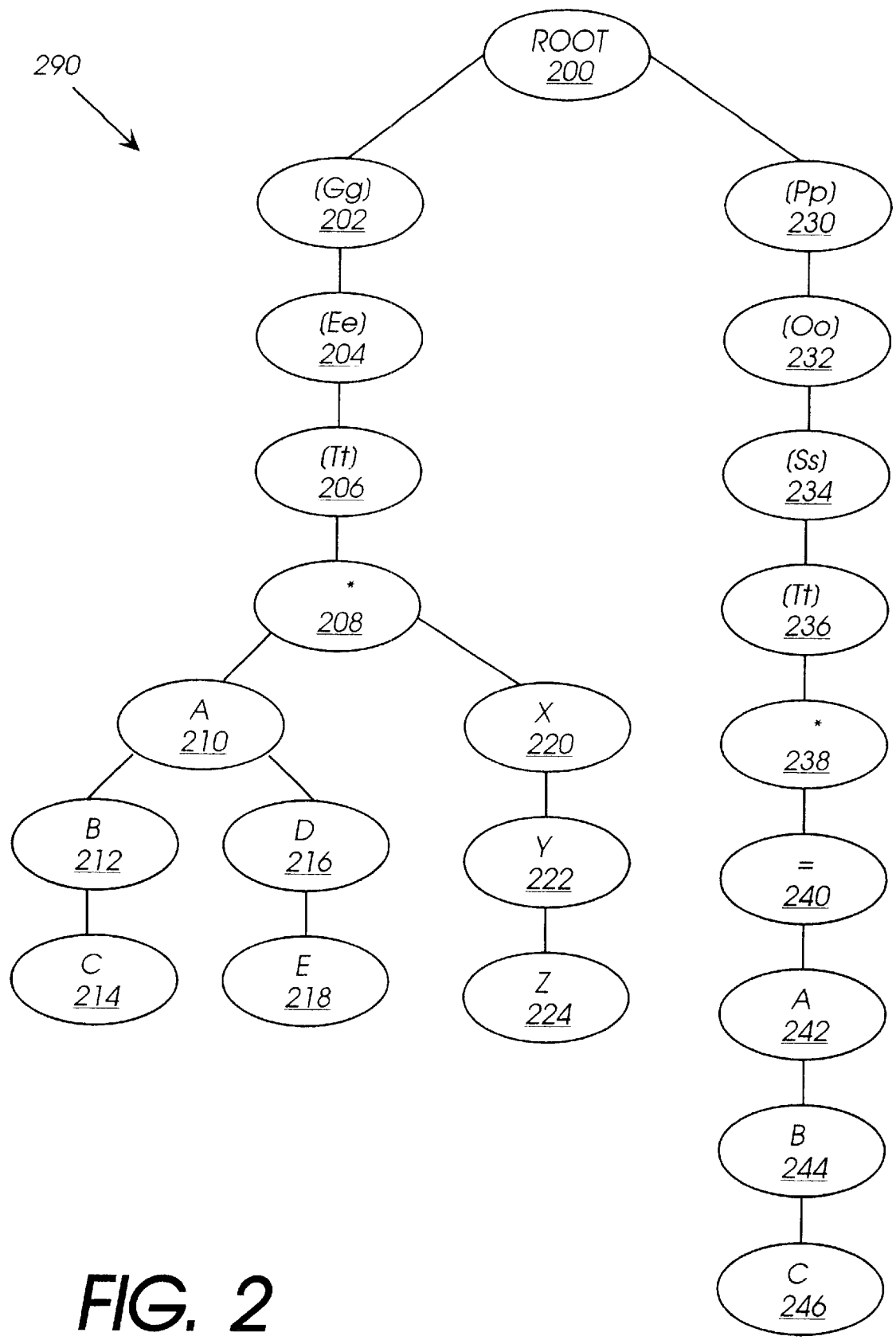
FIG. 2 illustrates an exemplary directed graph that can be used to describe the strings for which a search is performed.

FIG. 2 illustrates an exemplary directed graph that can be used to describe the strings for which a search is performed. In one embodiment, the directed graph is stored in shared memory accessible by the classification engines and the policy processor. In one embodiment, the strings (or patterns) searched for are specified as a collection of one or more regular expressions; however, other definitions can also be used. Regular expressions are described in greater detail by Wall, Larry and Schwartz, Randal L., "Programming Perl," pp. 103–106, O'Reilly & Associates, Inc., 1996. In the examples used herein to describe the string search scheme, the following strings are searched for:

[Gg] [Ee] [Tt].* A B C
[Gg] [Ee] [Tt].* A D E
[Gg] [Ee] [Tt].* X Y Z
[Pp] [Oo] [Ss] [Tt].*=A B C where "." indicates any value except a new line (a wild card indicator), "*" indicates zero or more of the preceding character, and "[Gg]" indicates both uppercase "G" or lowercase "g". Other expression indicators can also be used.

In one embodiment, the nodes of the directed graph illustrated in FIG. 2 have associated node values to identify the node. The node values are used, as described in greater detail below, for both the first stage and the second stage of the string search.

Figure 3:
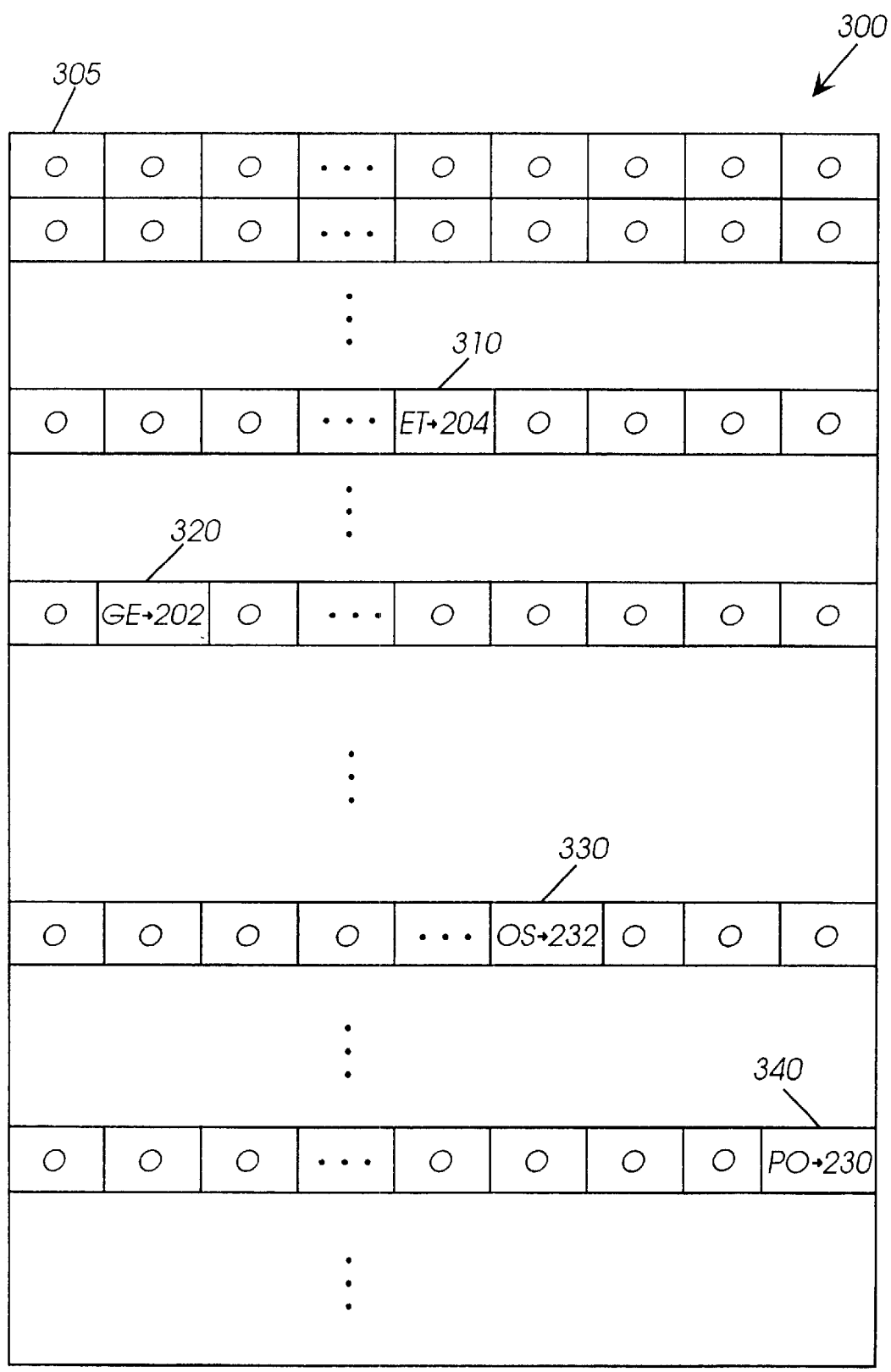
FIG. 3 illustrates a look up table for use during a first stage of the string search.

FIG. 3 illustrates a look up table for use during the first stage of the string search. In one embodiment, the first stage of the string search is performed on a two-byte (two character) block of data from a packet. In a two-byte block embodiment, look up table 300 has 65,536 entries, one for each possible two character combination; however, other table configurations can also be used.

In one embodiment, for each string to be searched for, two or more entries exist in look up table 300, the remaining entries (e.g., 0, −1, NULL) indicate that the two-byte combination does not match the beginning of a string of interest. Multiple look up tables can also be used. For strings having three or more characters where the first three characters are not a wildcard (i.e., not wildcard indicators), two entries exist in look up table 300 for each string. One entry corresponds to the first and second characters in the string and the second entry corresponds to the second and third characters in the string. Three characters can either start on a word boundary or in the second byte of the word. If packet starts on word boundary the first and second characters are used to for the first stage. If packet starts in the second byte of the word, the second and third characters are used for the first stage search. This avoids many false positives, which increases the overall performance of the search.

When a classification engine receives a packet of data, the packet is stored in a buffer. In one embodiment, the memory used for string searches is a shared memory accessible by one or more classification engines and one or more policy processors; however, separate memories can also be used. The first two-byte block is compared to a corresponding entry in look up table 300. For example, if the first two-byte block (the first byte and the second byte) is "00," which corresponds to the first entry (labeled 305) in table 300, the table entry indicates that "00" does not correspond to a string of interest.

The second two-byte block (the third byte and the fourth byte) are compared to a table entry in a similar manner. For example, if the second two-byte block is "GE," the corresponding entry (labeled 320) indicates that "GE" does correspond to a string of interest. Entry 320 in table 300 indicates the corresponding node (e.g., 202) of the directed graph 290. In one embodiment, the table entry indicates the node corresponding to the first character of the two-character block; however, other nodes can also be used (e.g., the third character of a three character block).

Table 300 also includes other entries corresponding to the directed graph of FIG. 2. Entry 310 indicates that "ET" corresponds to node 204 and 206 of directed graph 290.

Entry 330 indicates that "OS" corresponds to node 232 of directed graph 290 and entry 340 indicates that "PO" corresponds to node 230 of directed graph 290.

The entries of table 300 can include multiple nodes of directed graph 290. For example, if a string of interest begins with "ETC" the two-byte block of "ET" corresponds to "ETC" and to "GET." Table 300 can also include entries not shown in FIG. 3. For example, "et" corresponds to node 204 and 206 of directed graph 290. In one embodiment the classification engine generates a report corresponding to the results of the first stage of the search that is sent to the policy processor for each packet searched.

In one embodiment, when one of the first three characters in a string of three or more characters is a wildcard, more than two entries exist in look up table 300 for each string because the wildcard indicates that multiple characters correspond to the start of a string to be searched for. The necessary number of entries are made in look up table 300 during initialization. For example, if a string to be searched for begins with "GE*" one entry is made for "GE" and entries are made for each combination of "E" and another characters.

In one embodiment, when a string to be searched for contains two or three characters, the first two characters are used for the first stage search. When a string contains a single character, look up table 300 contains entries for a wildcard before the character and a wildcard after the character.

In one embodiment, if the string to be searched for contains four or more characters, the second, third and fourth characters of a string to be searched for are used as entries in look up table 300. As described below in greater detail with respect to FIG. 4, using the second, third and fourth characters rather than the first, second and third characters to identify the beginning of a string of interest can reduce the number of read operations during second stage search.

In one embodiment, data is accessed assuming 4-byte boundary alignment. However, packets that are to be searched may not be aligned on 4-byte boundaries, or may not be a 4-byte multiple in size. When a 4-byte block of data is not available from a packet, preceding or subsequent characters are used to provide a 4-byte block of data. For example, if a packet of data is six bytes in length, the first four bytes are searched as described above. The final four bytes of the packet are used for the second block of data. This results in two bytes being compared twice.

In one embodiment, if a packet is less than four bytes, the packet is processed using the second stage search. In an alternative embodiment, the first stage search processes four bytes and packets of four bytes or less are processed using the first stage search.

FIG. 4 illustrates one embodiment of a search report generated by a classification engine. In one embodiment, the first stage search report includes field 400 that indicates the number of potential strings of interest in the corresponding packet. In the example of FIG. 4, eight potential strings of interest were identified.

First stage search report 400 also includes an entry for each potential string of interest identified. In one embodiment, the entries include a seed identifier that identifies the blocks of data corresponding to a potential string of interest. For example, "204" in field 420 and "230" in field 460. The seed offset is the character where the second stage search begins. The first stage search report also includes a seed offset value that indicates an offset from the beginning of the packet to the potential string of interest. For example, "20" in field 450, which indicates that the potential string of interest starts at block 20 of the packet, and "54" in field 490.

In one embodiment, the first stage search report also includes the character before and the character after the seed. For example, "G" in field 430 and "T" in field 440 are the characters before and after, respectively, the seed having seed identifier 100. Similarly, "X" in field 470 and "O" in field 480 are the characters before and after, respectively, the seed having seed identifier 200.

In one embodiment, the first stage search report is sent to policy processor 150 along with a pointer to, or other indication of, the packet corresponding to the first stage search report. Policy processor 150 performs the second stage of searching as described in greater detail below based on the first stage search report. If the first stage search report indicates that no potential strings of interest exist in a packet, the packet is not further processed by policy processor 150.

Figure 5:
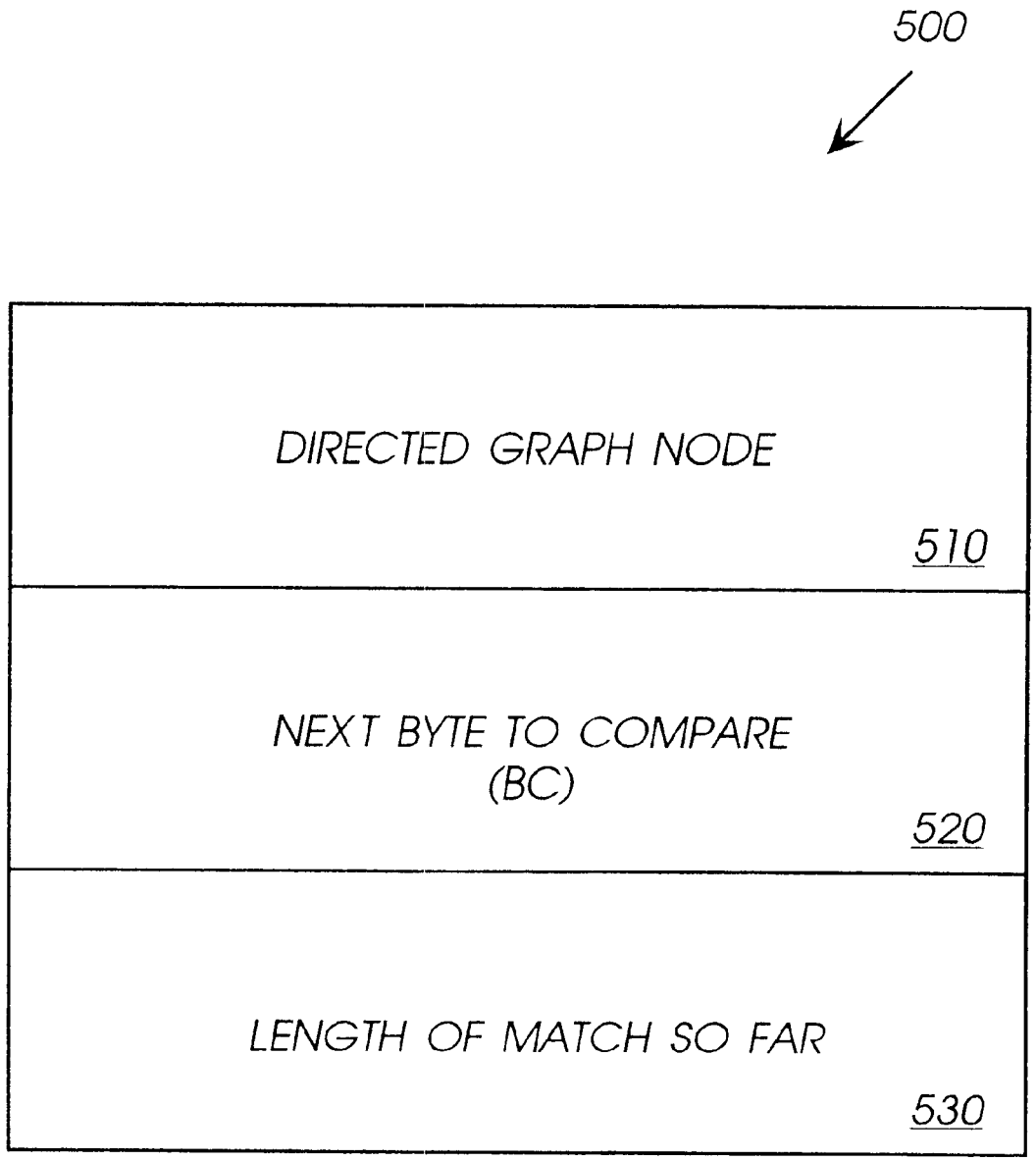
FIG. 5 illustrates a queue entry for one embodiment of second stage searching.

FIG. 5 illustrates one embodiment of a queue entry for second stage searching. In one embodiment, policy processor 150 maintains a queue having a list of active states for active seeds searches. Maintaining a queue allows searches to be performed on strings that span multiple packets. The entries in the queue are generated from the first stage search reports; however, multiple queue entries can be created from a single first stage search report entry. Initial states generated from first stage, but other states can be generated during the second stage. For example, if the definition of the string to be searched for includes a wildcard or other indicator that can be satisfied by the same characters (e.g., a node with multiple children), multiple entries can be maintained in the queue. In one embodiment, a packet having no potential strings of interest, as indicated by the first stage search report, is processed using the second stage search if active states exist in the second stage.

In one embodiment, each queue entry includes the directed graph node field 510 that corresponds to the current state of the search, next byte to compare field 520 indicates the next byte in the packet to compare (BC in the pseudocode below), and length of match so far field 530 indicates the number of bytes of the potential string that have matched so far.

In the beginning of the second stage there are two sources of states that are present in the queue: the states carried over from the previous packet and new states generated by the policy processor based on the first stage report for the new packet.

In one embodiment, the second stage of searching is performed according to the following pseudocode:

```
CURRENT BYTE COUNTER=0
WHILE CURRENT BYTE COUNTER<BUFFER
  LENGTH
  C=NEXT CHARACTER FROM INPUT BUFFER
  FOR ALL ACTIVE STATES IN THE QUEUE
    TAKE CURRENT STATE AND CHECK BC
      VALUE
    COMPUTE NEXT BC TO COMPARE
    IF BC>CURRENT BC THEN BREAK OUT OF
      FOR ALL
      ACTIVE STATES LOOP
    CURRENT NODE=CURRENT STATE->TOKEN
      POINTER
    FOR ALL CHILDREN OF CURRENT NODE
      IF CHILD ACCEPTS CHARACTER C
        ENQUEUE CHILD
    END FOR ALL CHILDREN
    IF CURRENT NODE DOES NOT NEED TO STAY
      ON THE
```

QUEUE THEN DEQUEUE CURRENT NODE
END FOR ALL ACTIVE STATES
CURRENT BYTE COUNTER=NEXT BC TO LOOK
AT
END OF WHILE

When placing states in the queue, the policy processor checks the children of the nodes included in the states in the queue. If a node has a child node that accepts a zero length input, the child is placed in the queue with the current node being processed. In one embodiment, states are added until a node is found having a child with a non-zero length. When a state is enqueued, the policy processor checks the state to determine whether it is a terminating (final) state for a string. If so a match is reported by, for example, executing a callback function or some other form of notification.

For the following example, a first packet being processed contains the following characters:

XYZGET1481910ABCGET14XYZTHENPO and a second packet being processed contains the following characters:

STXYZ=ABC . . .

A classification engine receives the first packet and stores the first packet in a buffer. The first two-byte block (XY) is accessed and the corresponding entry in look up table 300 is checked. Because XY does not correspond to the beginning of a string of interest, the classification engine continues processing without generating a first stage search report entry with the character before the seed and the character after the seed. The second two-byte block (ZG) similarly does not correspond to the beginning of a string of interest.

The first packet is similarly processed by the classification engine until the sixteenth byte (GE) is reached. Entry 320 of table 300 indicates that "GE" corresponds to node 202 of directed graph 290. The classification engine generates a first stage search report entry indicating a potential string of interest corresponding to node 202 that begins at byte 16 of the first packet.

Processing continues in a similar manner in the classification engine until the twenty-eighth byte (PO) is reached. Entry 340 of table 300 indicates that "PO" corresponds to node 230 of directed graph 290. The classification engine generates a first stage search report entry indicating a potential string of interest corresponding to node 230 that begins at byte 28 of the first packet. Because "PO" is at the end of the first packet, the first stage search report is generated and the policy engine 150 is notified that the first stage search report is complete. In one embodiment, the search report and the first packet are stored in shared memory accessible by one or more classification engines and one or more policy processors; however, other memory configurations can also be used.

The classification engine processes the second packet in the same manner as the first packet. Because the second packet does not contain any potential strings of interest, a first stage search report is generated indicating that no potential strings of interest were found in the second packet during the first stage search. The first stage search report for the second packet and the second packet are sent to the policy processor. If a potential string of interest overlaps to the second packet, the policy processor searches the second packet for strings of interest.

The policy processor further processes the first packet based on the first stage search report for the first packet while the classification engine performs a first stage search for the second packet and possibly other packets. Thus, the two stage processing allows detailed searches to be performed only when a potential match is identified, which increases performance as compared to more detailed search techniques. A two stage search using two processors allows parallel operation, which increases overall search performance.

In one embodiment, the policy processor performs a byte-by-byte comparison based on the entries to the queue. Based on the first stage search report for the first packet, the queue has three entries indicating the three potential matches described above. Starting with the first potential string of interest (ET), the policy processor compares the checks the preceding character "G" as indicated by the first stage search report. The policy processor also compares next byte in the packet ("1") with the child node of node 204, which indicates a wildcard. Because "1 " satisfies the wildcard condition of the child node the queue entry is updated to indicate that the subsequent byte also matches the nodes of directed graph 290.

Processing continues through node 208 (for "1481910"), node 210 (for "A"), node 212 (for "B") and node 214 (for "C"). Because node 214 is a final node and the path from node 200 to node 214 is matched by the first packet, the policy processor generates an indication of a matched string.

The second queue entry is processed in a similar manner by the policy processor. Processing beings at node 206 of directed graph 290. The path from node 200 to node 224 is satisfied by the data in the first packet. At node 224, the policy processor generates an indication of a matched string.

The third queue entry is processed in a similar manner by the policy processor. The policy processor begins at node 230 as indicated by the queue entry. However, at the end of the first packet ("O"), processing of the potential string of interest is not completed. Because the potential string of interest carries over into the second packet, which has no potential strings of interest as determined by the classification engine, the policy processor processes the second packet that would otherwise not be processed.

The last two bytes of the first packet and the first nine bytes of the second packet satisfy nodes 200 through 246 of directed graph 290. At node 224, the policy processor generates an indication of a matched string.

If match is found, the policy processor generates a message indicating that a string of interest has been identified. In one embodiment, the policy processor does not forward a packet having a string of interest and generates a message to a network management device to generate a warning indicating that a string of interest has been identified in a packet. Other information, for example, packet number, packet source, packet destination, can be included in the message.

If a packet is not processed by the policy processor (i.e., no potential matches found in the first stage and no overlapping searches from previous packets), the packet is output by the policy processor. In one embodiment, the packet is output to a network and sent to the packet's originally intended destination. In alternative embodiments, the packet can be sent to a classification engine or second policy processor for further processing, or the packet can be sent to a network component, for example, a router or a switch.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

I claim:

1. An apparatus comprising:
one or more classification engines to receive network traffic, the one or more classification engines to perform a first stage search on the network traffic and to generate a first stage search report in response to the first stage search, the first stage search report to indicate multiple potential strings of interest having a first portion matching a corresponding portion of one or more predetermined strings; and
a policy processor coupled to the one or more classification engines, the policy processor to perform a second stage search on the packet, the second stage search comparing subsequent portions of the potential strings of interest from the first stage search report to the one or more predetermined strings to determine whether a match exists.

2. The apparatus of claim 1 wherein the policy processor further comprises maintain a queue having an entry for each potential string of interest compared to the one or more predetermined strings.

3. The apparatus of claim 2 wherein the policy processor maintains one or more queue entries corresponding to multiple sets of data.

\* \* \* \* \*